United States Patent
Oriani

(10) Patent No.: US 8,053,526 B2
(45) Date of Patent: Nov. 8, 2011

(54) FLUOROELASTOMER PROCESS AID CONTAINS POLYALKYLENE OXIDE AND POLYCAPROLACTONE

(75) Inventor: Steven R. Oriani, Landenberg, PA (US)

(73) Assignee: DuPont Performance Elastomers LLC, Wilmington, DE (US)

( * ) Notice: Subject to any disclaimer, the term of this patent is extended or adjusted under 35 U.S.C. 154(b) by 253 days.

(21) Appl. No.: 12/469,066

(22) Filed: May 20, 2009

(65) Prior Publication Data

US 2010/0298503 A1 Nov. 25, 2010

(51) Int. Cl.
*C08L 27/12* (2006.01)
(52) U.S. Cl. ........ 525/199; 525/200
(58) Field of Classification Search ........ 525/199, 525/200
See application file for complete search history.

(56) References Cited

U.S. PATENT DOCUMENTS

| | | | |
|---|---|---|---|
| 3,125,547 A | 3/1964 | Blatz | |
| 4,855,360 A | 8/1989 | Duchesne et al. | |
| 6,642,310 B2 | 11/2003 | Chapman, Jr. et al. | |
| 6,894,118 B2 * | 5/2005 | Chapman et al. | 525/186 |
| 7,001,951 B2 * | 2/2006 | Chapman et al. | 525/101 |
| 2004/1019281 | 9/2004 | Oriani et al. | |
| 2004/0260022 A1 * | 12/2004 | Amos et al. | 525/123 |
| 2005/0043456 A1 * | 2/2005 | Oriani | 524/285 |
| 2005/1004345 | 2/2005 | Oriani | |
| 2006/0025523 A1 | 2/2006 | Barriere et al. | |

* cited by examiner

*Primary Examiner* — Bernard Lipman

(57) ABSTRACT

A process aid for improving the processability of non-fluorinated melt processible polymers contains a fluoroelastomer having a Mooney viscosity (ML (1+10) at 121° C.) between 30 and 100 and at least two interfacial agents, one a polycaprolactone having a Mn between 2000 and 8000 and the other a polyalkylene oxide having a Mn between 3000 and 5000.

12 Claims, No Drawings

FLUOROELASTOMER PROCESS AID CONTAINS POLYALKYLENE OXIDE AND POLYCAPROLACTONE

FIELD OF THE INVENTION

The present invention relates to process aids for improving the processability of non-fluorinated melt processible polymers, more particularly to process aids comprising a fluoroelastomer having a Mooney viscosity (ML (1+10) at 121° C.) between 30 and 100 and at least two interfacial agents, one a polycaprolactone having a Mn between 2000 and 8000 and the other a polyalkylene oxide having a Mn between 3000 and 5000.

BACKGROUND OF THE INVENTION

The melt extrusion of non-fluorinated melt processible polymers into shaped structures such as tubing, pipe, wire coating or film is accomplished by well-known procedures wherein a rotating screw pushes a viscous polymer melt through an extruder barrel into a die in which the polymer is shaped to the desired form and is then subsequently cooled and solidified into a product having the general shape of the die.

In order to achieve low production costs, it is desirable to extrude the polymer at rapid rates. Higher extrusion rates may be readily obtained by increasing the rate of revolution of the extruder screw. However, this technique is subject to limitations imposed by the viscoelastic properties of the polymer substrate. Thus, at very high extrusion rates an unacceptable amount of thermal decomposition of the polymer can result. Further, extrudates having a rough surface are often obtained which can lead to formation of an undesirable pattern on the surface of the extrudate.

In Blatz, U.S. Pat. No. 3,125,547, it is disclosed that the use of 0.01-2.0 wt. % of a fluorocarbon polymer that is in a fluid state at the process temperature, such as a fluoroelastomer, will reduce die pressure in extrusions of non-fluorinated polymers such as high and low density polyethylenes and other polyolefins. Further, use of this additive allows significant increase in extrusion rates without melt fracture.

More recently, improved fluoropolymer process aid compositions have been disclosed in, for example, U.S. Pat. Nos. 4,855,360; 6,642,310 B2 and U.S. 2006/0025523 A1. These compositions contain both a fluoropolymer and an interfacial agent such as a polyalkylene oxide or a polycaprolactone. The number average molecular weight (Mn) of these interfacial agents may be anything between about 400 to over 200,000. Low Mn (<5000) polyethylene glycol (PEG) works especially well in some process aids to reduce the time required to eliminate melt fracture of extrudable compositions. However, the low Mn PEG is moderately soluble in water which can cause massing problems in humid environments. Low Mn PEG is also susceptible to production of very low molecular weight fragments through thermally induced oxidative decomposition, making it potentially unstable during processing of the non-fluorinated melt processible polymer. These very low molecular weight PEG fragments can impart undesirable odor or taste characteristics in the extrudate, or cause unreliable printing or sealing of extruded films as the fragments bloom out of the polyethylene host polymer.

Thus there is a need for a process aid composition which reduces melt fracture in non-fluorinated melt processible polymers without massing or decomposing.

SUMMARY OF THE INVENTION

It has been surprisingly discovered that a process aid comprising a fluoroelastomer of Mooney viscosity and at least two different interfacial agents of specific number average molecular weight, rapidly reduces or eliminates melt fracture in non-fluorinated melt processible polymers without massing problems or excessive thermal decomposition of the process aid.

Accordingly, one aspect of the present invention is a process aid composition comprising:

A) 10 to 90 weight percent, based on total weight of said process aid composition, of a fluoroelastomer having a ML (1+10)@ 121° C. of 30 to 100;

B) 5 to 85 weight percent, based on total weight of said process aid composition, of a polycaprolactone having a Mn between 2000 and 8000; and C) 5 to 85 weight percent, based on total weight of said process aid composition, of a polyalkylene oxide having a Mn between 3000 and 5000.

DETAILED DESCRIPTION OF THE INVENTION

The present invention is directed to process aid compositions. These compositions improve the extrusion processability of non-fluorinated melt processible polymers. The term "extrusion processability" as used herein refers to the conditioning time (i.e. the elapsed time between extruder start up when extruded articles exhibit a high degree of melt fracture and the time when an extrudate has a smooth surface, free of melt fracture). Obviously, in order to minimize waste and reduce costs, a very short conditioning time is desirable.

Examples of non-fluorinated melt processible polymers include, but are not limited to, hydrocarbon resins, chlorinated polyethylene, and co-polymers of ethylene with oxygen bearing monomers such as vinyl acetate, methyl acrylate, methyl methacrylate, butyl acrylate, maleic anhydride, acrylic acid, and methacrylic acid. By the term "non-fluorinated" it is meant that the ratio of fluorine atoms to carbon atoms present in the polymer is less than 1:1. The non-fluorinated melt-processible polymers that may be employed with the process aid compositions of this invention may be selected from a variety of polymer types. Such polymers include hydrocarbon polymers having melt indexes (measured according to ASTM D1238 at 190° C., using a 2160 g weight) of 5.0 g/10 minutes or less, preferably 2.0 g/10 minutes or less. The hydrocarbon polymers may be elastomeric copolymers of ethylene, propylene, and optionally a non-conjugated diene monomer, for example 1,4-hexadiene. In general, hydrocarbon polymers also include any thermoplastic hydrocarbon polymer obtained by the homopolymerization or copolymerization of a monoolefin of the formula $CH_2$=CHR, where R is H or an alkyl radical, usually of not more than eight carbon atoms. In particular, this invention is applicable to polyethylene, of both high density and low density, for example, polyethylenes having a density within the range 0.85 to 0.97 $g/cm^3$; polypropylene; polybutene-1; poly(3-methylbutene); poly(methylpentene); and copolymers of ethylene and alpha-olefins such as propylene, butene-1, hexene-1, octene-1, decene-1, and octadecene. Hydrocarbon polymers may also include vinyl aromatic polymers such as polystyrene. Because specific hydrocarbon polymers exhibit differing melt characteristics, the practice of this invention may have greater utility in some hydrocarbon polymers than in others. Thus, hydrocarbon polymers such as polypropylene and branched polyethylene that are not of high molecular weight have favorable melt flow characteristics even at lower temperatures, so that surface roughness and other surface defects can be avoided by adjustment of extrusion conditions. These hydrocarbon polymers may only require the use of the process aid compositions of this invention under unusual and exacting extrusion conditions. However, other polymers such as high molecular weight, high density polyethylene, linear low density polyethylene copolymers, high molecular weight polypropylene, and propylene copolymers with other olefins, particularly those with narrow molecular weight distributions, do not permit this degree of freedom in variation of extrusion conditions. It is particularly with these resins that improvements in the surface quality of the extruded product are obtained with the process aid compositions of this invention.

Preferably the non-fluorinated melt processible polymer is a polyolefin selected from the group consisting of linear low density polyethylene, high molecular weight, high density polyethylene, high molecular weight polypropylene, and propylene copolymers with other olefins, particularly those with narrow molecular weight distributions. Most preferably, the polyolefin is linear low density polyethylene.

Fluoroelastomers useful in the process aid compositions of this invention are fluoropolymers that are normally in the fluid state at room temperature and above, i.e. fluoropolymers which have values of $T_g$ below room temperature and which exhibit little or no crystallinity at room temperature. It is preferred, but not essential, to employ fluoroelastomers having a fluorine to hydrogen ratio of at least 1:1.5. Fluorinated monomers which may be copolymerized to yield suitable fluoroelastomers include, but are not limited to vinylidene fluoride, hexafluoropropylene, chlorotrifluoroethylene, tetrafluoroethylene and perfluoroalkyl perfluorovinyl ethers. Specific examples of the fluoroelastomers which may be employed include, but are not limited to copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and a comonomer selected from hexafluoropropylene, 1-hydropentafluoropropylene or 2-hydropentafluoropropylene; and copolymers of tetrafluoroethylene, propylene and, optionally, vinylidene fluoride, all of which are known in the art. In some cases these copolymers may also include bromine-containing comonomers as taught in Apotheker and Krusic, U.S. Pat. No. 4,035,565, or terminal iodo-groups, as taught in U.S. Pat. No. 4,243,770. The latter patent also discloses the incorporation of iodo group-containing fluoroolefin comonomers into fluoroelastomers. When fluorinated monomers are present in these copolymers in certain molar ratios, the glass transition temperature of the polymer is near or below 0° C., and the compositions are useful elastomers that are readily available articles of commerce. Preferably the fluoroelastomers employed in the compositions of this invention contain copolymerized units of i) vinylidene fluoride/hexafluoropropylene; ii) vinylidene fluoride/hexafluoropropylene/tetrafluoroethylene; iii) tetrafluoroethylene/propylene; or iv) tetrafluoroethylene/propylene/vinylidene fluoride. Copolymers of vinylidene fluoride and hexafluoropropylene are especially preferred.

Fluoroelastomers employed in the process aid compositions of this invention have a Mooney viscosity (ML(1+10) at 121° C.) between 30 and 100, preferably between 50 and 90, more preferably between 60 and 80, and are present at a level between 10 and 90 (preferably between 10 and 60, more preferably between 10 and 30) weight percent (wt. %), based on the total weight of the process aid composition. More than one fluoroelastomer may be employed in the compositions of this invention, wherein the total fluoroelastomer level is between 10 and 90 wt. %.

Compositions of this invention also comprise between 5 and 85 (preferably between 25 and 70, more preferably between 40 and 60) wt. %, based on the total weight of the process aid composition, of at least one polycaprolactone having a number average molecular weight (Mn) between 2000 and 8000.

Compositions of this invention further comprise between 5 and 85 (preferably between 5 and 50, more preferably between 5 and 25) wt. %, based on the total weight of the process aid composition, of at least one polyalkylene oxide having a number average molecular weight (Mn) between 3000 and 5000. Polyalkylene oxides are defined as polymers of ethylene oxide, propylene oxide or copolymers of ethylene oxide and propylene oxide. The copolymers may be block or random.

Process aid compositions of the invention may also contain minor amounts of other ingredients commonly employed in process aids including, but not limited to partitioning agents, antioxidants, etc.

A process suitable for making the process aid compositions of this invention is one in which the fluoroelastomer, polycaprolactone and polyalkylene oxide are combined in any order. For example, the fluoroelastomer, polycaprolactone, and polyalkylene oxide may be pelletized, ground, or otherwise comminuted to a sufficiently small particle size so that these ingredients may be dry blended to form the final process aid composition. Ribbon blenders, V-cone blenders, tumble blenders, plough mixers, and the like are suitable for mixing such particulate ingredients. Alternatively, fluoropolymer may be ground to a sufficiently small particle size, and then mixed with polycaprolactone and polyalkylene oxide at a temperature such that at least one of these interfacial agents is molten. The mixture may then be cooled and pelletized or granulated. Such mixing may take place in a twin screw extruder, a single screw extruder, a Banbury® mixer, a Farrel Continuous Mixer®, or the like.

The process aid compositions of this invention are particularly useful in the extrusion of non-fluorinated melt processible polymers for manufacture of blown films and wire and cable jacketing. Typical process aid levels in extrudable compositions are 100 to 1000 ppm, corresponding to 10 to 900 ppm fluoroelastomer, 5 to 850 ppm polycaprolactone and 5 to 850 ppm polyalkylene oxide.

EXAMPLES

The materials employed in these examples were as follows:

The non-fluorinated melt processible polymer used for process aid tests was LL1001.59 (available from Exxon-Mobil Corp.), having a melt index (MI, 190° C., 2160 g) of 1.0 dg/min. The LL1001.59 is a pelletized LLDPE containing anti-oxidant and catalyst neutralizer.

The non-fluorinated melt processible polymer used as a carrier for masterbatch compounding was LL1002.09 (available from Exxon-Mobil Corp.), having a melt index (MI, 190° C., 2160 g) of 2.0 dg/min. The LL1002.09 is an LLDPE reactor powder containing a small amount of anti-oxidant and no catalyst neutralizer.

Fluoroelastomer was a vinylidene fluoride/hexafluoropropylene (60/40 wt. ratio) copolymerfluoroelastomer having a ML(1+10) at 121° C. of 70. The fluoroelastomer was cryogenically ground so as to pass through a 20 mesh screen, and mixed with a total of 9 wt. % calcium carbonate and talc powders as partitioning agents. The ground and dusted fluoroelastomer is designated 'FE' in the examples.

Polycaprolactone employed was PCL 4000: CAPA 2403D6 (available from Perstorp) having Mn of 4000. It is supplied in a granular form.

Polyalkylene oxides employed were available from Sigma-Aldrich Corp., as described below. All were supplied in a granular form.

PEG 1500, having Mn of 1500
PEG 2000, having Mn of 2000
PEG 3350, having Mn of 3350
PEG 4600, having Mn of 4600
PEG 8000, having Mn of 8000
PEG 100000, having Mn of 100000

The extrudable compositions used to evaluate process aid performance contained diatomaceous earth as an anti-block. The anti-block masterbatch was supplied by Ampacet Corp., product 10063.

Example 1

Process aid compositions of the invention (E1-E4) and comparative process aid compositions (C1-C11) were produced by dry blending the FE, PCL 4000, and various PEG types. Formulations are shown in Table I.

TABLE I

| Ingredients, wt. % | C1 | C2 | C3 | C4 | C5 | C6 | C7 | C8 | C9 | C10 | C11 | E1 | E2 | E3 | E4 |
|---|---|---|---|---|---|---|---|---|---|---|---|---|---|---|---|
| FE | 25 | 25 | 25 | 25 | 25 | 25 | 25 | 25 | 25 | 25 | 25 | 25 | 25 | 25 | 25 |
| PCL 4000 | 75 | | | | 64.5 | 64.5 | 64.5 | 64.5 | 50 | 50 | 50 | 64.5 | 64.5 | 50 | 50 |
| PEG 1500 | | | | | 10.5 | | | | 25 | | | | | | |
| PEG 2000 | | | | | | 10.5 | | | | 25 | | | | | |
| PEG 3350 | | 75 | | | | | | | | | | 10.5 | | 25 | |
| PEG 4600 | | | 75 | | | | | | | | | | 10.5 | | 25 |
| PEG 8000 | | | | 75 | | | 10.5 | | | | | | | | |
| PEG 100000 | | | | | | | | 10.5 | | | 25 | | | | |

Masterbatches of the process aids in Table I were produced by dry blending 2 wt. % of each process aid composition with LL1002.09, and then melt mixing the blend in a 28 mm twin screw extruder operating at a screw speed of 150 rpm, with temperature set points for the various zones of:

| Zone 1 (feed): | 160° C. |
|---|---|
| Zone 2: | 160° C. |
| Zone 3 | 200° C. |
| Die (exit) | 200° C. |

The extruded strands were cooled in a water bath and pelletized. A separate masterbatch was produced for each of the process aid compositions in Table I.

Extrudable compositions for testing were made by dry blending 1.5 wt. % to 2.0 wt. % of each process aid masterbatch with LL1001.59, along with 2.5 wt. % of the diatomaceous earth masterbatch.

Blown films 25 microns in thickness were produced from these extrudable compositions using a 2.5 inch (6.35 cm) 24:1 L/D extruder equipped with a 4 inch (10.16 cm) blown film die having either a 0.030 inch (0.76 mm) or a 0.055 inch (1.40 mm) gap. Barrel zone temperatures (starting at the feed section) were 160° C., 180° C., 194° C., and 190° C., with adapter and die temperatures of 190° C. The screw was a conventional design with a barrier flight, operating at approximately 40 revolutions per minute (rpm). The screw rpm was adjusted slightly during the course of each process aid test to maintain a steady extruder output of 45.4 kg/hour. This output resulted in apparent shear rates in the die gap of approximately 540 sec$^{-1}$ for the 0.03 inch (0.76 mm) die gap, and 160 sec$^{-1}$ for the 0.055 inch (1.40 mm) die gap.

Prior to each test run, the extruder and die were purged with a masterbatch containing 50 wt. % silica (diatomaceous earth) in order to remove the fluoroelastomer from the previous test. After purging the silica masterbatch from the extruder with LL1001.59, blown film was produced using 100% LL1001.59 for 10 minutes to ensure that each test began with 100% melt fracture.

After running 10 minutes on pure LL1001.59, the extrudable composition being tested dropped into the feed throat of the extruder, and a digital timer with a one second readout was started. The melt fracture removal performance of each extrudable composition was monitored by continuous visual observation of the roughness of the melt exiting the die and of the blown film. When no melt fracture was visible in this manner, the digital timer was stopped, and a film sample was taken for inspection to ensure that the melt fracture was completely eliminated. If the melt fracture was completely removed, the conditioning time was recorded as the time registering on the digital timer.

The results of these tests are shown in Table II.

TABLE II

| Process Aid | Die Gap, mm | Process Aid Level, ppm | Time to 0% Melt Fracture, minutes |
|---|---|---|---|
| C1 | 0.76 | 300 | 48 |
| C2 | 0.76 | 300 | 32 |
| C3 | 0.76 | 300 | 32 |
| C4 | 0.76 | 300 | 74 |
| C7 | 0.76 | 300 | 41 |
| C1 | 1.40 | 400 | 49 |
| C2 | 1.40 | 400 | 25 |
| C3 | 1.40 | 400 | 25 |
| C4 | 1.40 | 400 | 68 |
| C5 | 1.40 | 400 | 41 |
| C6 | 1.40 | 400 | 42 |
| C7 | 1.40 | 400 | 40 |
| C8 | 1.40 | 400 | 44 |
| C9 | 1.40 | 400 | 37 |
| C10 | 1.40 | 400 | 36 |
| C11 | 1.40 | 400 | 39 |
| E1 | 0.76 | 300 | 37 |
| E2 | 0.76 | 300 | 35 |
| E3 | 0.76 | 300 | 32 |
| E4 | 0.76 | 300 | 32 |
| E1 | 1.40 | 400 | 33 |
| E2 | 1.40 | 400 | 35 |
| E3 | 1.40 | 400 | 23 |
| E4 | 1.40 | 400 | 25 |

Comparative process aid compositions C1-C4 were based on fluoroelastomer and a single type of interfacial agent, either PCL or PEG. Comparative process aid compositions C5-C11 were based on a combination of PCL 4000 and PEG, but the molecular weight of the PEG was either too low or too high for optimal results.

In both the high and low shear rate tests (0.76 mm and 1.40 mm die gaps, respectively), comparative process aids C2 and C3 based solely on fluoroelastomer and either PEG 3350 or PEG 4600 cleared fracture faster than any of the other comparative compositions. Unfortunately, these compositions suffered from drawbacks noted previously related to the high level of low molecular weight PEG present.

Surprisingly, process aid compositions of the invention E1-E4 performed similarly to C2 and C3 at both the high and low shear rate conditions, even though they contained only 14 wt. % to 33.3 wt. % of the PEG 3350 or PEG 4600 level of the comparative compositions. Comparative compositions C5-C11 show criticality of selecting a PEG number average molecular weight within the 3000 to 5000 range, even when blended with PCL 4000. These compositions cleared fracture more slowly at both high and low shear rates than inventive compositions E1-E4.

What is claimed is:

1. A process aid composition comprising:
   A) 10 to 90 weight percent, based on total weight of said process aid composition, of a fluoroelastomer having a ML (1+10)@ 121° C. of 30 to 100;
   B) 5 to 85 weight percent, based on total weight of said process aid composition, of a polycaprolactone having a Mn between 2000 and 8000; and
   C) 5 to 85 weight percent, based on total weight of said process aid composition, of a polyalkylene oxide having a Mn between 3000 and 5000.

2. A process aid composition of claim 1 wherein said fluoroelastomer is present at a level between 10 and 60 weight percent, based on total weight of said process aid composition.

3. A process aid composition of claim 2 wherein said fluoroelastomer is present at a level between 10 and 30 weight percent, based on total weight of said process aid composition.

4. A process aid composition of claim 1 wherein said fluoroelastomer has a ML (1+10)@ 121° C. of 50 to 90.

5. A process aid composition of claim 4 wherein said fluoroelastomer has a ML (1+10)@ 121° C. of 60 to 80.

6. A process aid composition of claim 1 wherein said fluoroelastomer comprises copolymerized units selected from the group consisting of i) vinylidene fluoride/hexafluoropropylene; ii) vinylidene fluoride/hexafluoropropylene/tetrafluoroethylene; iii) tetrafluoroethylene/propylene; and iv) tetrafluoroethylene/propylene/vinylidene fluoride.

7. A process aid composition of claim 6 wherein said fluoroelastomer comprises copolymerized units of vinylidene fluoride/hexafluoropropylene.

8. A process aid composition of claim 1 wherein said polyalkylene oxide is selected from the group consisting of i) polyethylene oxide, ii) polypropylene oxide and iii) copolymers of ethylene oxide and propylene oxide.

9. A process aid composition of claim 8 wherein said polyalkylene oxide is present at a level between 5 and 50 weight percent, based on total weight of said process aid composition.

10. A process aid composition of claim 9 wherein said polyalkylene oxide is present at a level between 5 and 25 weight percent, based on total weight of said process aid composition.

11. A process aid composition of claim 1 wherein said polycaprolactone is present at a level between 25 and 70 weight percent, based on total weight of said process aid composition.

12. A process aid composition of claim 11 wherein said polycaprolactone is present at a level between 40 and 60 weight percent, based on total weight of said process aid composition.

* * * * *